(12) United States Patent
Gonzalez

(10) Patent No.: US 11,824,423 B2
(45) Date of Patent: Nov. 21, 2023

(54) POWER GENERATION SYSTEM AND METHOD

(71) Applicant: Henry Gonzalez, Upland, CA (US)

(72) Inventor: Henry Gonzalez, Upland, CA (US)

(*) Notice: Subject to any disclaimer, the term of this patent is extended or adjusted under 35 U.S.C. 154(b) by 90 days.

(21) Appl. No.: 17/721,563

(22) Filed: Apr. 15, 2022

(65) Prior Publication Data

US 2023/0336053 A1    Oct. 19, 2023

(51) Int. Cl.
| | |
|---|---|
| *H02K 7/18* | (2006.01) |
| *H02K 11/049* | (2016.01) |
| *B63B 35/44* | (2006.01) |
| *B63B 39/02* | (2006.01) |
| *F03B 13/10* | (2006.01) |

(52) U.S. Cl.
CPC ........... *H02K 7/1823* (2013.01); *B63B 35/44* (2013.01); *B63B 39/02* (2013.01); *F03B 13/10* (2013.01); *H02K 7/1876* (2013.01); *H02K 11/049* (2016.01); *B63B 2035/4466* (2013.01)

(58) Field of Classification Search
CPC .................. H02K 7/1823; B63B 39/02; B63B 2035/4466
See application file for complete search history.

(56) References Cited

U.S. PATENT DOCUMENTS

2021/0203209 A1* 7/2021 Bonutti .................. H02M 7/00

* cited by examiner

*Primary Examiner* — Joseph Ortega
(74) *Attorney, Agent, or Firm* — JAFARI LAW GROUP, INC.

(57) ABSTRACT

The present invention discloses a power generation system to power a cryptocurrency mining operation. The system comprises at least one power producing module having at least one first hollow member and at least one second hollow member. The second hollow member is filled with fluid, for example, water. The system further comprises at least one conductive coil disposed over the second hollow member. The system further comprises at least one movable magnet disposed within the second hollow member and a magnetic flux field of the magnet is in contact with the conductive coil. The system is configured to generate energy when the magnetic flux field of the magnet passes through the conductive coil.

20 Claims, 12 Drawing Sheets

POWER GENERATION SYSTEM AND METHOD

TECHNICAL FIELD OF THE INVENTION

The present disclosure relates generally to a power generation system, and more particularly, to a system for power generation from an electromagnetic field in an underwater or land environment that is efficient and environmentally friendly.

BACKGROUND OF THE INVENTION

Generating a sufficient energy supply to run the world's ever increasingly energy hungry operation has become a goal on which many modern scientists are intensely focused. New methods to generate and conserve electrical energy are needed. Unfortunately, most engineers and scientists are focusing on new technologies for answers and solutions that cost billions of dollars to develop and implement.

Conventional power generation systems are not easily configurable for different settings, require large scale construction and are not commercially viable. Furthermore, most of the conventional power generation systems are permanent structures that cannot be moved easily, and they are also not topographically adaptable. Further, the weight of the traditional generator having magnets and copper wire inhibits replacement.

As such, there is a need for a cost-effective and an easy-to-operate method and apparatus that may generate electricity continuously. Alternatively, and more particularly, there is a need to use an alternative source of energy that is cost-effective, simple to operate, environmentally friendly (i.e., has a low carbon footprint), and that also generates electricity continuously.

SUMMARY OF THE INVENTION

The present invention discloses a system and method for power generation from an electromagnetic field. The power generation system may be configured to distribute power or store power for any number of purposes, including for powering a cryptocurrency operation, a desalination plant, or any other system requiring power.

In exemplary embodiments, a system comprises at least one power producing module having at least one first hollow member and at least one second hollow member. The second hollow member is filled with fluid, for example, water. The system further comprises at least one conductive coil disposed over the second hollow member. The system further comprises at least one movable magnet disposed within the second hollow member. The system further comprises a driving assembly configured to move the magnet along a length of the power producing module and more specifically along a length of the conductive coil in order to generate power. In one embodiment, the conductive coil is a copper coil. In one embodiment, the power producing module is submerged underwater. In other embodiments, the power producing module is situated on land.

In exemplary embodiments, the drive assembly is disposed within the second hollow member configured to move the magnet. The magnet comprises one or more rollers on two opposing sides that contacts the second hollow member. The rollers, or any other suitable means of reducing friction, may be situated on the opposing sides of the magnet. The drive assembly may comprise a gas source configured to create gas bubbles that directly move the magnet by flowing up the tubular structure. In other exemplary embodiments, a ballast tank may be used to carry the magnet along a length of the tube.

The second hollow member composed of a top portion and a bottom portion. A plurality of apertures is formed at the top portion of the second hollow member to allow passage of gas bubbles therethrough. The system further comprises a collector assembly in fluid communication with the apertures of the second hollow member to collect the gas bubbles through the apertures. The collector assembly is in fluid communication with the bottom portion of the second hollow member to re-use the collected gas bubbles. The system further comprises a stopper device configured to stop the movement of the magnet on reaching the top portion of the second hollow member to allow passage of gas bubbles through the apertures. The system further comprises a powerhouse electrically coupled to the power producing module to store and distribute the generated energy.

In one aspect of the invention, a method may be employed to install and run the system. This method may include the steps of: installing at least one power producing module including: providing at least a first hollow tube and a second hollow tube disposed within the first hollow tube; providing at least one conductive coil wound over the second hollow tube; providing at least one magnet configured to move inside of the second hollow tube along a length of the conductive coil; and filling the second hollow tube with a fluid; coupling an energy distribution or storage unit to the conductive coil of the power producing module; coupling a drive assembly configured to apply a gas into at least a portion of the second hollow tub of the power producing module; and moving, by means of the drive assembly, the at least one magnet inside of the second hollow tube along the length of the conductive coil to generate power.

In some exemplary embodiments, installing the at least one power producing module further includes providing a ballast tank inside the second hollow tube, the ballast tank configured to move the magnet inside of the second hollow tube along a length of the conductive coil. In some exemplary embodiments, coupling the drive assembly comprises removably connecting the drive assembly to the ballast tank inside the second hollow. In some exemplary embodiments, moving the at least one magnet by means of the drive assembly comprises filling the ballast tank with gas.

In some exemplary embodiments, the method may further include restraining the ballast tank while filling the ballast tank with the gas; and releasing the ballast tank once the ballast tank is filled with gas so that the ballast tank is driven upwards along the length of the conductive coil wound around the second hollow tube.

In some exemplary embodiments, the method may further include upon the ballast tank moving the magnet to a top terminal end of the second hollow tube, restraining the magnet at the top terminal; releasing gas from the ballast tank to allow the ballast tank to fall downwards to a bottom terminal end of the second hollow tube; and releasing the magnet at the top terminal so that the magnet falls downward along the length of the conductive coil wound around the second hollow tube. In exemplary embodiments, moving by means of the drive assembly the at least one magnet inside of the second hollow tube comprises generating gas bubbles that cause the magnet to flow upwards along the length of the conductive coil wound around the second hollow tube.

In exemplary embodiments, installing the at least one power producing module further includes fluidly connecting the second hollow tube disposed within the first hollow tube of the at least one power producing module to an exterior fluid tank.

In exemplary embodiments, installing the at least one power producing module further includes coupling a gas storage unit to the drive assembly. In some aspects of the invention, a method may be performed by a system. Such method may include, driving at least one magnet upwards along a length of a hollow tube filled with a fluid by filling, with a gas, a ballast tank removably coupled to the at least one magnet, wherein at least one conductive coil is wound over and along the length of the hollow tube; releasing the gas from the ballast tank to allow the magnet to fall downwards along a length of the hollow tube; and distributing or storing power generated by the movement of the magnet upwards and downwards along a length of the at least one conductive coil wound over and along the length of the hollow tube.

In exemplary embodiments, the method may further comprise of restraining the ballast tank at a bottom of the hollow tube while filling the ballast tank with the gas, and further releasing the ballast tank once the ballast tank is filled with the gas so that the ballast tank is driven upwards to a top terminal end of the hollow tube along the length of the conductive coil.

In exemplary embodiments, upon the ballast tank moving the magnet to a top terminal end of the hollow tube, the magnet at the top terminal end of the hollow tube may be restrained. Furthermore, the gas may be released from the ballast tank to allow the ballast tank to fall downwards to a bottom terminal end of the second hollow tube.

In exemplary embodiments, the magnet may be released at the top terminal so that the magnet falls downward along the length of the conductive coil wound around the hollow tube.

In exemplary embodiments, the method may further include restraining the ballast tank at a bottom of the hollow tube or restraining the magnet at the top terminal end of the hollow tube comprises activating a locking mechanism. In some embodiments, activating the locking mechanism comprises activating a programmable time release. In some embodiments, activating the locking mechanism comprises activating a sensor to detect a position of the ballast tank or a position of the magnet. In some embodiments, while filling the ballast tank with the gas, water from the ballast tank may be expelled by way of valves disposed on the ballast tank. Moreover, in some embodiments, a gas or other propellant may be used to propel or speed up the movement of the magnet through the hollow tube and along the length of the conductive coil.

In another aspect of the invention, a method may be performed by a power generation system. The method may include: driving at least one magnet upwards along a length of a hollow tube filled with a fluid by filling, with a gas, a ballast tank removably coupled to the at least one magnet, wherein at least one conductive coil is wound over and along the length of the hollow tube; releasing the gas from the ballast tank to allow the magnet to fall downwards along a length of the hollow tube; and distributing or storing power generated by the movement of the magnet upwards and downwards along a length of the at least one conductive coil wound over and along the length of the hollow tube.

In some exemplary embodiments, the method further includes restraining the ballast tank at a bottom of the hollow tube while filling the ballast tank with the gas.

In some exemplary embodiments, the method further includes releasing the ballast tank once the ballast tank is filled with the gas so that the ballast tank is driven upwards to a top terminal end of the hollow tube along the length of the conductive coil.

In some exemplary embodiments, the method further includes upon the ballast tank moving the magnet to a top terminal end of the hollow tube, restraining the magnet at the top terminal end of the hollow tube.

In some exemplary embodiments, the method further includes releasing the gas from the ballast tank to allow the ballast tank to fall downwards to a bottom terminal end of the second hollow tube.

In some exemplary embodiments, the method further includes releasing the magnet at the top terminal so that the magnet falls downward along the length of the conductive coil wound around the hollow tube.

In some exemplary embodiments, restraining the ballast tank at a bottom of the hollow tube or restraining the magnet at the top terminal end of the hollow tube comprises activating a locking mechanism. In some exemplary embodiments, activating the locking mechanism comprises activating a programmable time release. In some exemplary embodiments, activating the locking mechanism comprises activating a sensor to detect a position of the ballast tank or a position of the magnet.

In some exemplary embodiments, the method further includes, while filling the ballast tank with the gas, expelling water from the ballast tank by way of valves disposed on the ballast tank.

Various objectives and advantages of the present invention will become apparent from the following description taken in conjunction with the accompanying drawings wherein are set forth, by way of illustration and example, certain embodiments of this invention. The drawings submitted herein constitute a part of this specification, include exemplary embodiments of the present invention, and illustrate various objects and features thereof.

BRIEF DESCRIPTION OF THE DRAWINGS

The power generation system as disclosed herein is described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows.

DETAILED DESCRIPTION OF EXAMPLE EMBODIMENTS

Figure 1:
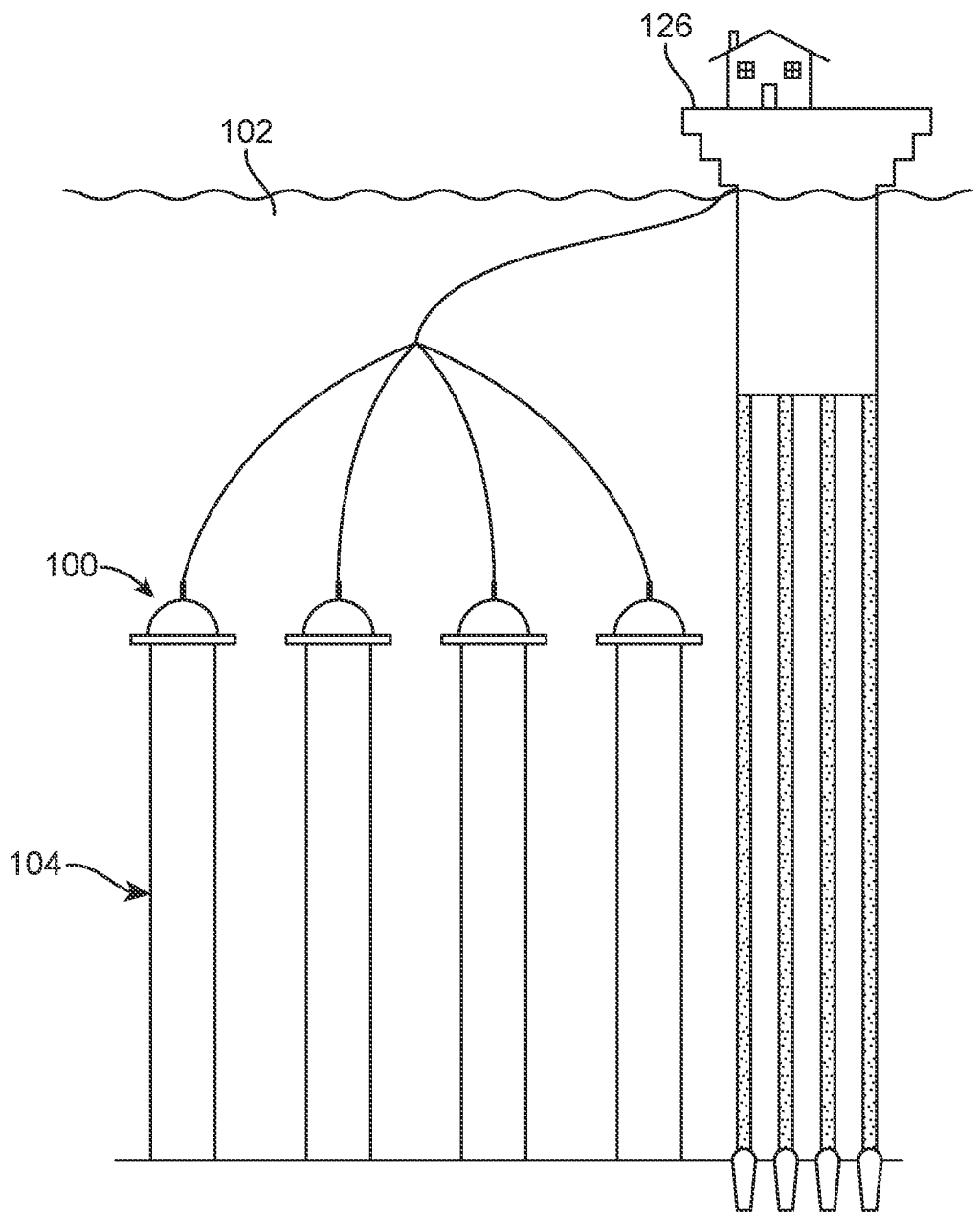
FIG. 1 exemplarily illustrates a power generation system installed in a water environment, according to an embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

Figure 2:
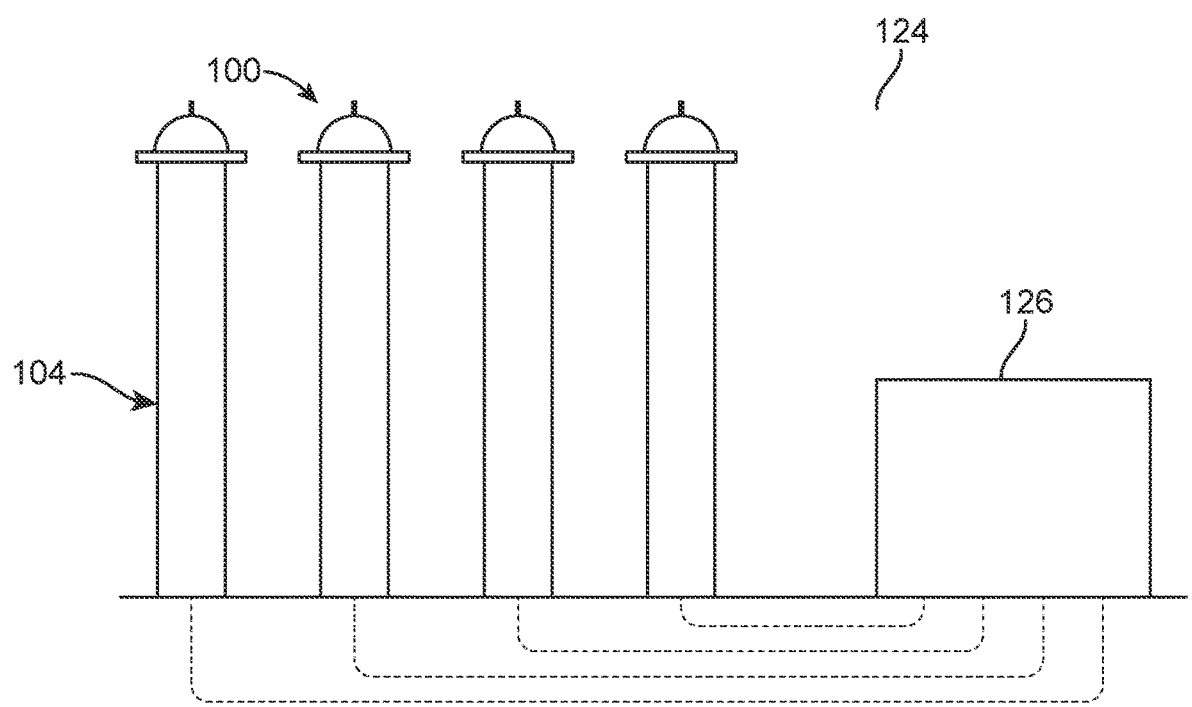
FIG. 2 exemplarily illustrates a power generation system installed in a land environment, according to an embodiment of the present invention.

FIG. 1 illustrates a power generation system 100 installed in a water environment, according to an embodiment of the present invention; FIG. 2 exemplarily illustrates power generation system 100 alternatively installed in a land environment; and FIG. 3-FIG. 5 exemplarily illustrate a cross sectional view of a power generation module, that may be a module of system 100, in accordance with the present invention. As may be appreciated from these views, installing system 100 in deep water has great advantages, including for example the depth and length each power generating module may be.

Figure 5:
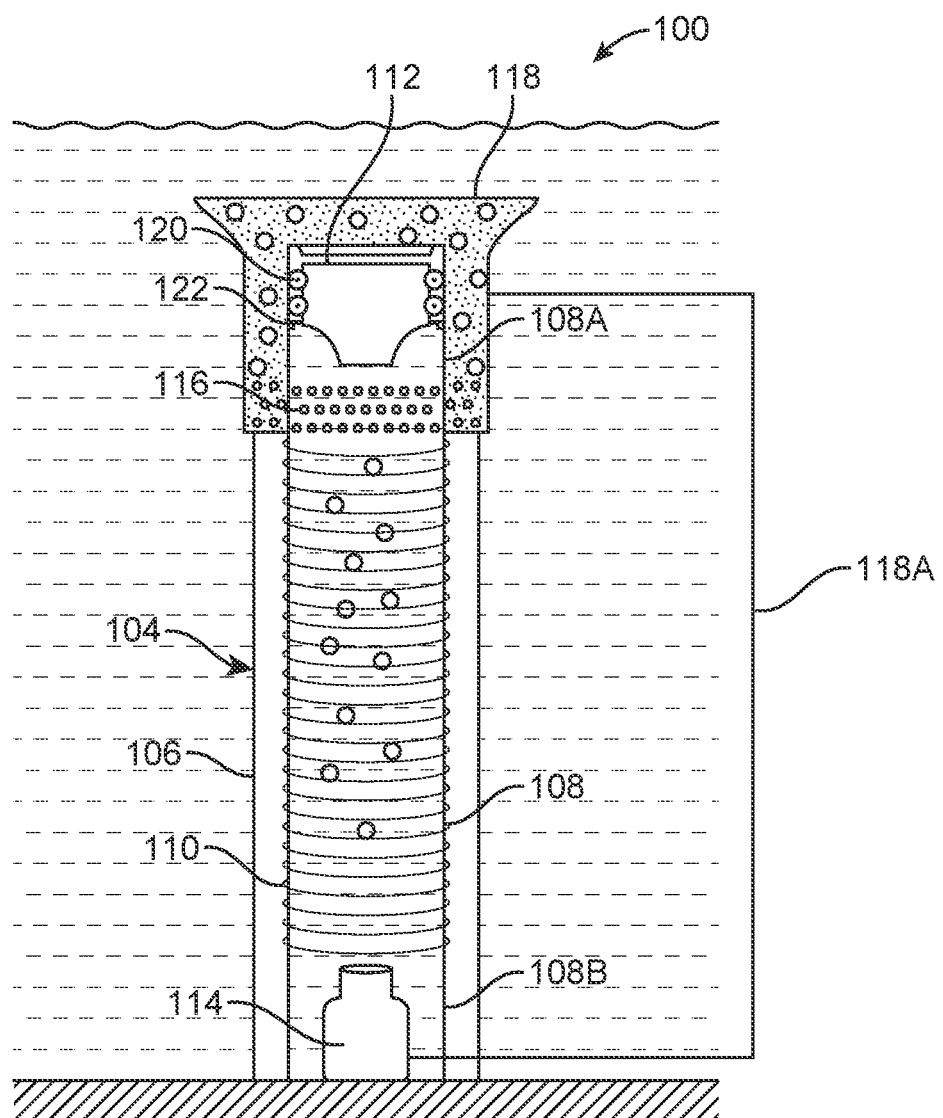
FIG. 5 exemplarily illustrates a cross sectional view of a power generation module in accordance with the present invention, in which gas bubbles pass though apertures of a hollow member.

Referring to FIG. 1 FIG. 5, the power generation system 100, hereinafter referred to as system 100, may comprise at least one power producing module 104 having at least one first hollow member 106 and at least one second hollow member 108. The second hollow member 108 is filled with fluid, for example, water. In one embodiment, the system 100 comprises a plurality of power producing modules 104. The system 100 further comprises at least one conductive coil 110 disposed over the second hollow member 108. The system 100 further comprises at least one movable magnet 112 disposed within the second hollow member 108, wherein the magnet 112 is configured to move, by means of a drive assembly 114, 114a inside the tube 108B and more specifically along the length of the conductive coil 110 to generate power. The generated energy or electrical power may be transferred to a powerhouse 126 for further usage and distribution.

In one embodiment, the magnet 112 may have circular cross section. In another embodiment, the magnet 112 may have any other shape including, but not limited to circular, and cylindrical shape. The system 100 is configured to generate energy when the magnet 112 is moved by means of drive assembly 114, 114a inside the tube 108B and more specifically along the length of the conductive coil 110. The generated energy or electrical power is transferred to the powerhouse 126 for further usage and distribution. In one embodiment, the power producing module 104 is submerged underwater. In another embodiment, the power producing module 104 is adapted to float in a water environment and a movement of water induces the movement of the magnet 112. The first hollow member 106 is attached to an annular float in the water environment 102 and the second hollow member 108 disposed within the first hollow member 106 adapted to move within the first hollow member 106.

The system 100 further comprises a drive assembly disposed within the second hollow member 108 configured to move the magnet 112. The magnet 112 comprises one or more rollers 120 on two opposing sides that contacts the second hollow member 108. The rollers 120 on the opposing sides may be equal in number and adapted to rotate in both forward and rearward direction (or up and down the tubular structure that encompasses each hollow member).

In one embodiment, the drive assembly is a gas source 114 configured to create gas bubbles, which flows up to move the magnet 112. In another embodiment, the gas source 114 is a naturally occurring gas source.

In yet another embodiment, the drive assembly is an air source configured to create air bubbles, which flows up to move the magnet 112. In yet another embodiment, the drive assembly is a gas source 114 that injects gas inside a ballast tank configured to float (and thus move upward along the tubular structure of the hollow member). In another embodiment, helium may be used, or any other gas or fluid that less atomic weight than that of the fluid in the second hollow tube.

The second hollow member 108 may include a top portion 108A and a bottom portion 108B. A plurality of apertures 116 may be formed at the top portion 108A of the second hollow member 108 to allow passage of gas bubbles therethrough. The system 100 further comprises a collector assembly 118 in fluid communication with the apertures 116 of the second hollow member 108 to collect the gas bubbles through the apertures 116 (for example via pump system 118a) that is configured to drive air back to the bottom of the drive assembly. The collector assembly 118 may be in fluid communication with the bottom portion 108B of the second hollow member 108 to re-use the collected gas bubbles.

The system 100 further comprises a stopper device configured to stop the movement of the magnet 112 on reaching the top portion 108A of the second hollow member 108. In one embodiment, the stopper device is a gear box with a delay switch 122. When the magnet 112 moves past the apertures 116, the stopper device prevents the magnet 112 from moving backwards for a particular period of time to allow escape of gas bubbles from the gas source 114 through the apertures 116. The stopper device allows the movement of the magnet 112 after the particular period of time.

The hollow members 106, 108 may be made out of any type of sturdy, preferably non-magnetic material. The main requirement is that the material can withstand the stress of being underwater and not interfere with the operation of the one or more magnets. The hollow members 106, 108 may come in different shapes and sizes. While the hollow members 106, 108 shown has circular cross-section and a cylindrical shape, other sizes and shapes may be used without departing from the spirit and scope of the present invention.

Figure 3:
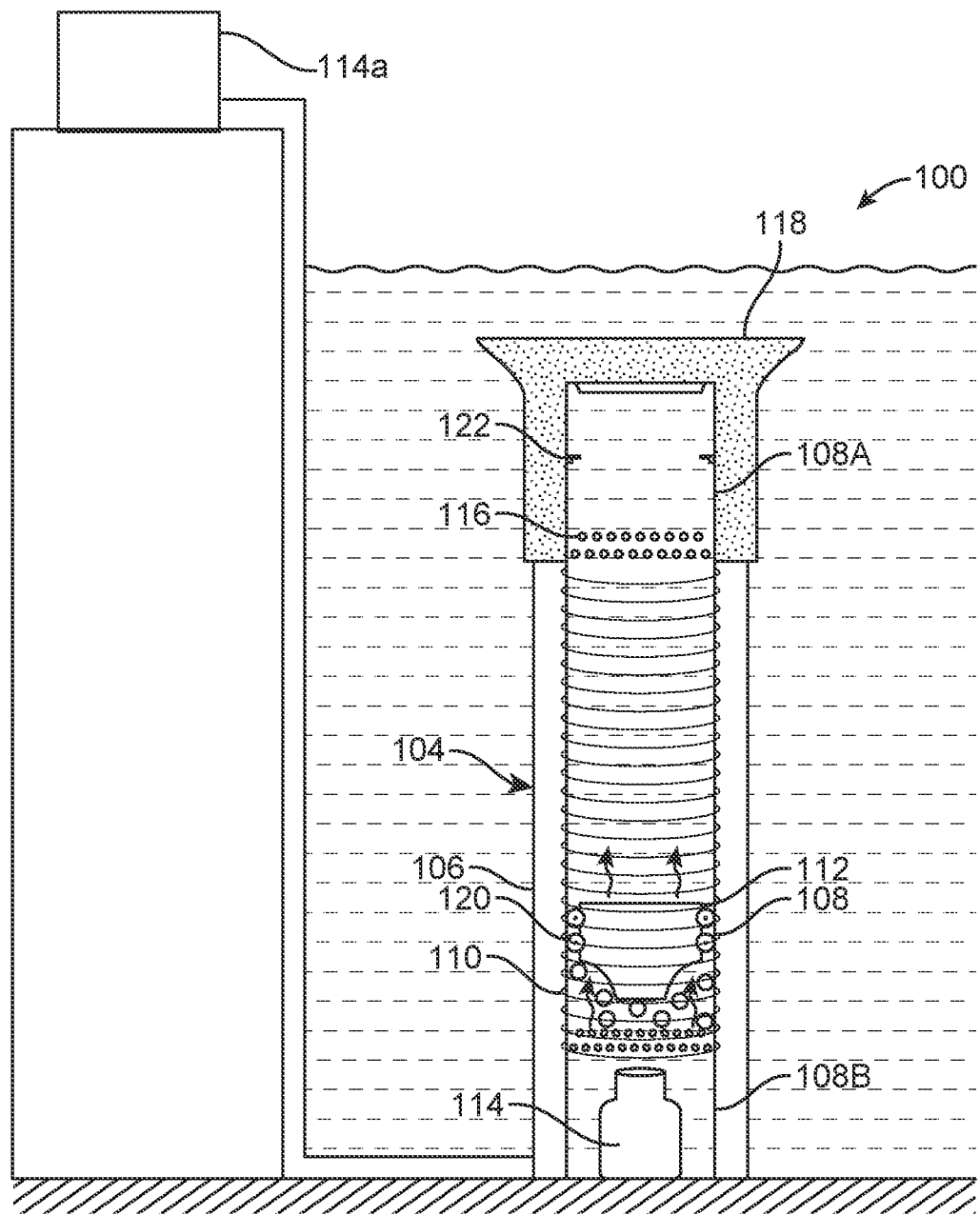
FIG. 3 exemplarily illustrates a cross sectional view of a power generation module in accordance with the present invention.

Referring specifically to FIG. 3, system 100 may be exemplarily submerged underwater wherein the second hollow member 108 is filled with water as well. In another embodiment, the system 100 may be placed on a land and fill the second hollow member 108 with water. The gas source 114 may be configured to generate gas, which flow from the bottom portion 108B towards the top portion 108A of the second hollow member 108. The gas moving upwards pushes the magnet 112 though the second hollow member 108 wounded with conductive coil 110, which generates the electrical power. Similarly, in other exemplar embodiments, a ballast tank that supports the magnet may be instead filled with a gas to force the ballast tank upwards along the tubular structure.

Figure 4:
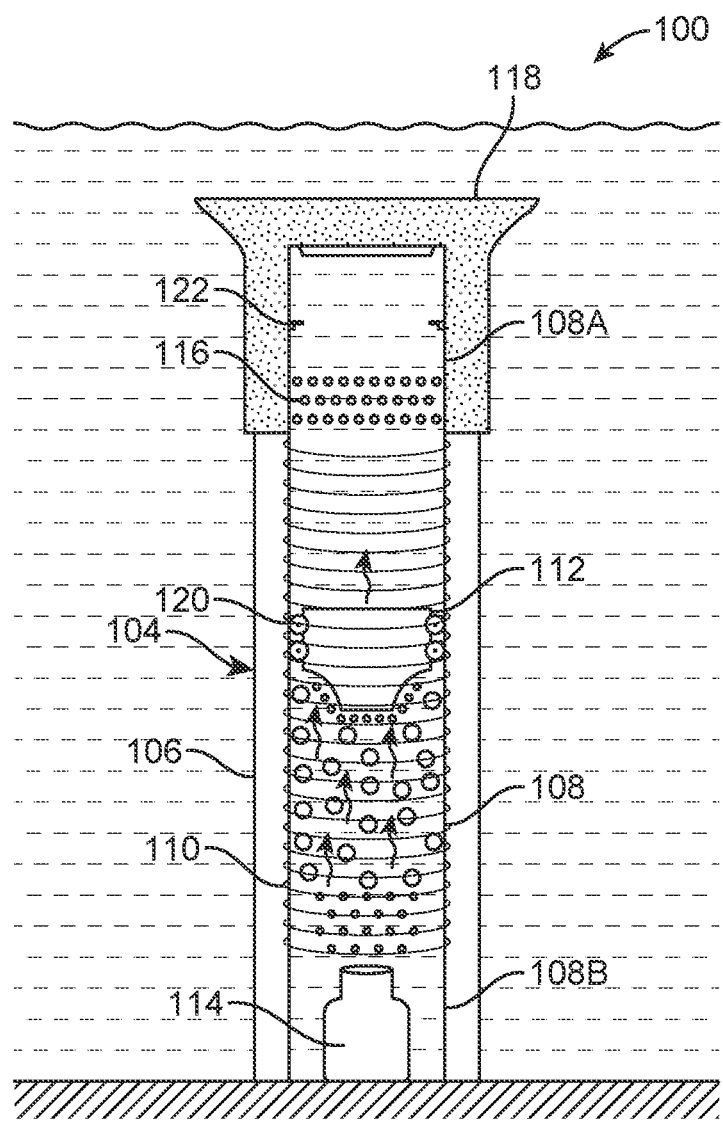
FIG. 4 exemplarily illustrates a cross sectional view of a power generation module in accordance with the present invention, depicting a magnet being driven upwards along a tubular structure of the power generation module.

Referring to FIG. 4, the rollers 120 together with the gas bubbles facilitates ease in movement of the magnet 112, represented by the upward arrow. Referring to FIG. 5, once the magnet 112 reaches the top portion 108A of the second hollow member 108, the stopper device prevents the magnet 112 from moving back to the bottom portion 108B of the second hollow member 108 until so desired to be released so the magnet can travel downward. The gas bubbles pushing the magnet 112 passes through the apertures 116 and collected in the collector assembly 118.

Upon a triggering event, such as for example and without limiting the scope of the present invention, the passage of a predetermined time, delay switch 122 may be released and without any force from the gas being applied to magnet 112, the magnet will fall through the tubular structure of the power producing module 104 and thus magnet 112 again passes through the second hollow member 108 wounded with conductive coil 110, which generates electrical power that may be collected at suitable power station, rechargeable battery source, or the like.

Figure 6:
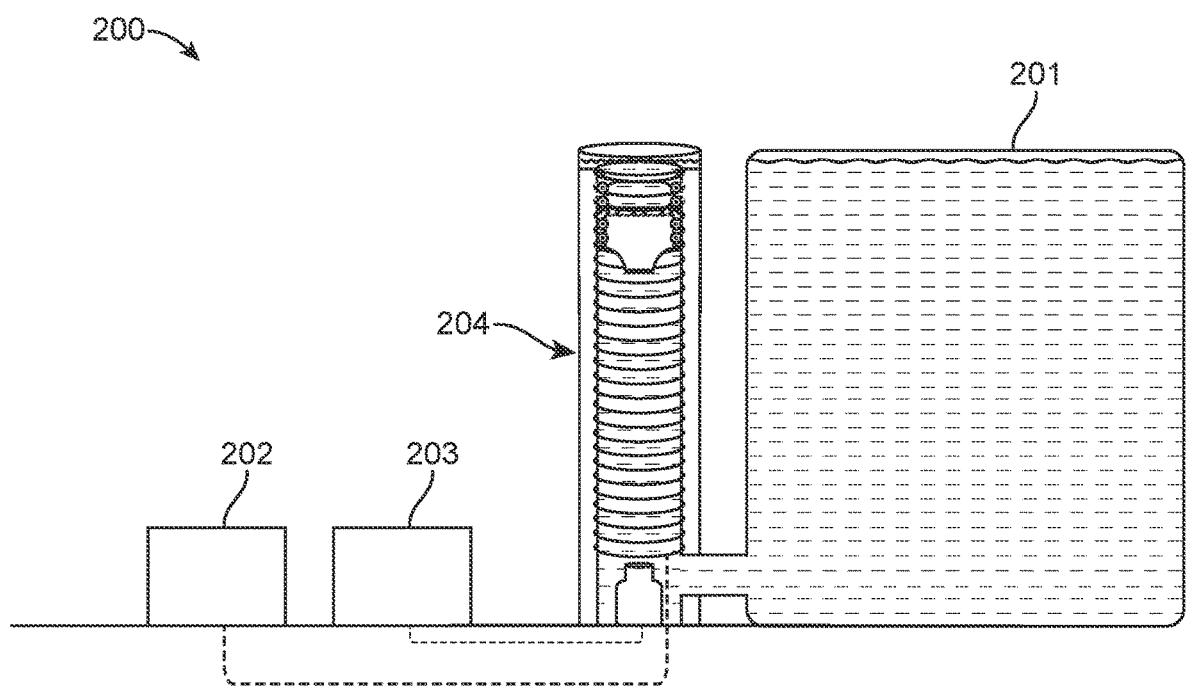
FIG. 6 exemplarily illustrates a power generation system according to one embodiment of the present invention.

Turning now to the next figure, FIG. 6 exemplarily illustrates a power generation system according to an embodiment of the present invention in which a water tank is installed to hold the water and thus avoid installing the system in a large water environment such as a lake or ocean. This embodiment of a system 200 in accordance with the present invention obviates many of the challenges of such systems dependent on large bodies of water, including for example, maintenance and installing of the system 100 components.

In accordance with the embodiment illustrated in FIG. 6, system 200 may comprise a water tank 201 that is in fluid communication with at least one power producing module 204 that may be installed above ground. A rechargeable battery or power storage device 202 may be coupled to the power producing module 204 in a manner such that the storage device 202 collects energy generated when the magnet 208 is moved by means of drive assembly 203 inside the tube 205 and more specifically along the length of the conductive coil 209. That is, the generated energy or electrical power is transferred to a storage device 202 for further usage and distribution. System 200 further includes a gas source 203 coupled to and in fluid communication with the power producing module 204 such that the gas source is able to supply a gas for propelling a magnet's movement along a length of the power producing module 204 in a similar fashion as discussed with reference to other embodiments mentioned above. In exemplary embodiments, a power producing module 204 may comprise of the tubular structure show, wherein a first tubular or cylindrical hollow structure is disposed within a second tubular or cylindrical hollow structure, and wherein at least the second or outer tubular structure is opened to air. In some embodiments, a type of lid or protective structure that allows water to flow therethrough may be employed, such as a grate or the like, as will be discussed in more detail below. Notably, if both are filled with water, then open air works, if only the inner tube is filled with water, then there is no need to be an open air tank.

Figure 7:
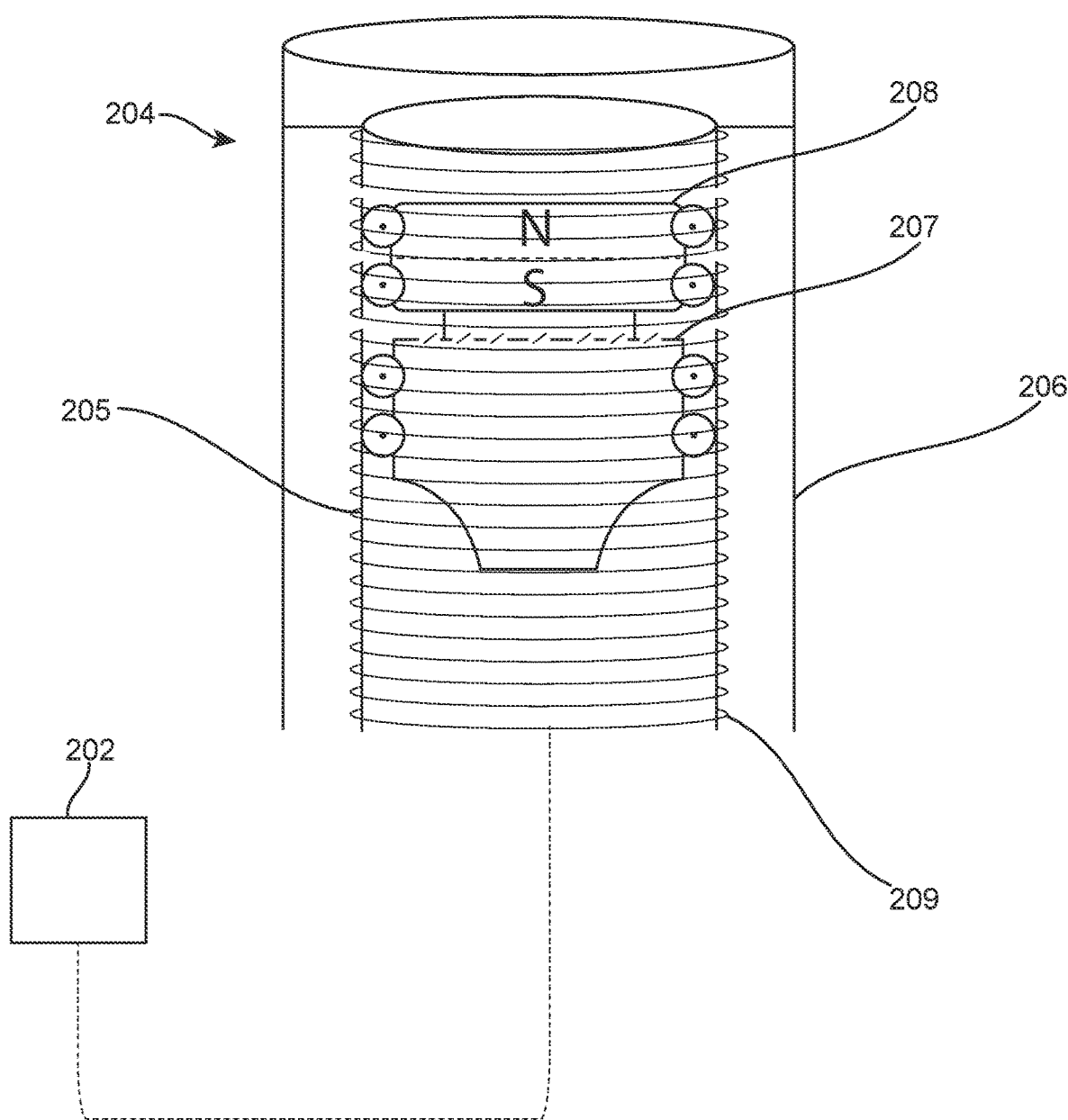
FIG. 7 exemplarily illustrates a schematic of a power generator in accordance with one embodiment of the present invention.

A more detailed view of power producing module 204 is shown in FIG. 7. As may be appreciated from this view, in some exemplary embodiments, the power producing module 204 may include a first hollow tube 205 and a second hollow tube 206 disposed within the first hollow tube 205. The first hollow tube 205 houses a ballast tank 207 that supports a magnet 208, wherein the ballast tank 207 is configured to move along a length of hollow tube 205. The first hollow tube 205 may be filled with fluid, for example, water, as it is in fluid communication with the water tank 201. As with the other embodiments described above, at least one conductive coil 209 disposed over the first hollow tube 205 (i.e., around an exterior of the tube) and within hollow tube 206. A wire connecting the coil 209 may be configured to carry electrons to either act as an alternating current or to a battery or to an otherwise suitable power storage device.

As will be explained with reference to the following figures discussed below, several components including but not limited to apertures, valves, switches, and other structural mechanisms may be employed in order to facilitate an efficient and controlled movement of magnet 208 along a length of the power producing module 204 so as to maximize the energy generated via system 200.

Figure 8:
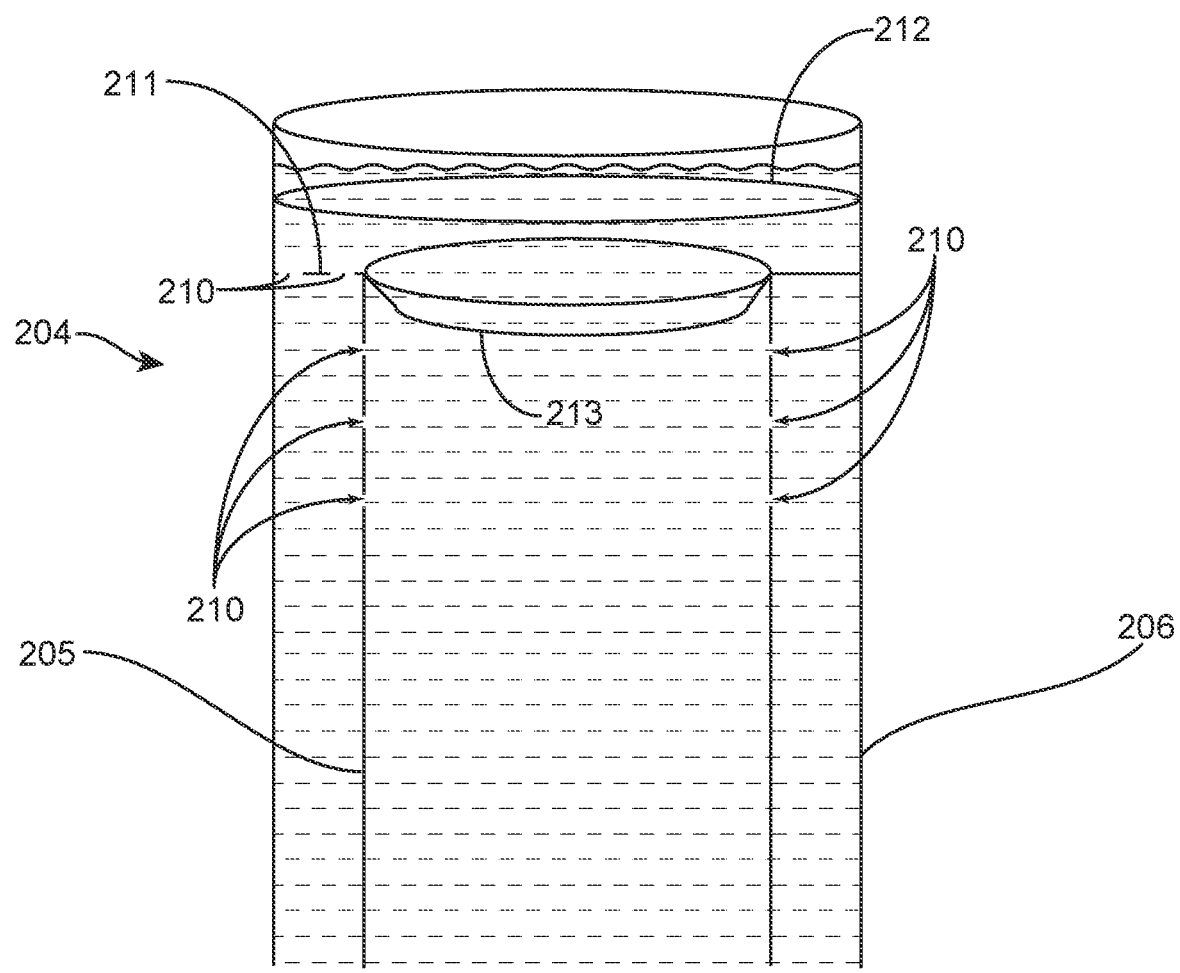
FIG. 8 exemplarily illustrates a cross-sectional view of components of a power generator in accordance with the present invention.

Turning first to FIG. 8, an exemplarily schematic cross-sectional view of power producing module 204 in accordance with the present invention is shown (i.e., depicted in this view without ballast tank, magnet, or coil components). From this view, it may be appreciated that hollow tube 205 of power producing module 204 may include apertures 210 along its side walls, which enable the free flow of water to move from and to hollow tube 206. Moreover, these apertures 210 allow for air or any gas used by the system to propel the ballast tank 207 along the length of the inner hollow tube 205. In some exemplary embodiments, it may be desirable to include a structure, such as a strut 211 for providing structural support for the coil that is wrapped around an outer shell of the inner hollow tube 205. In some exemplary embodiments, other apertures 210 may be employed along the strut 211. In some exemplary embodiments, a metal grate fenestration 212 may facilitate water to be free to surface. In some exemplary embodiments, a bumper type of mechanism, such as bumper device 213, may be employed below the fenestration 212 in order to provide a structural stop for the magnet or magnetic component that reaches this top-most terminal end of the power producing module 204. In some embodiments, bumper device 213 may be comprised of latex, rubber, silicone, or other materials that have a desirable stiffness but are not too rigid so as to maintain a structural integrity of the magnet or magnetic component that will be continuously making contact with this top-most terminal end of the power producing module 204.

Figure 9:
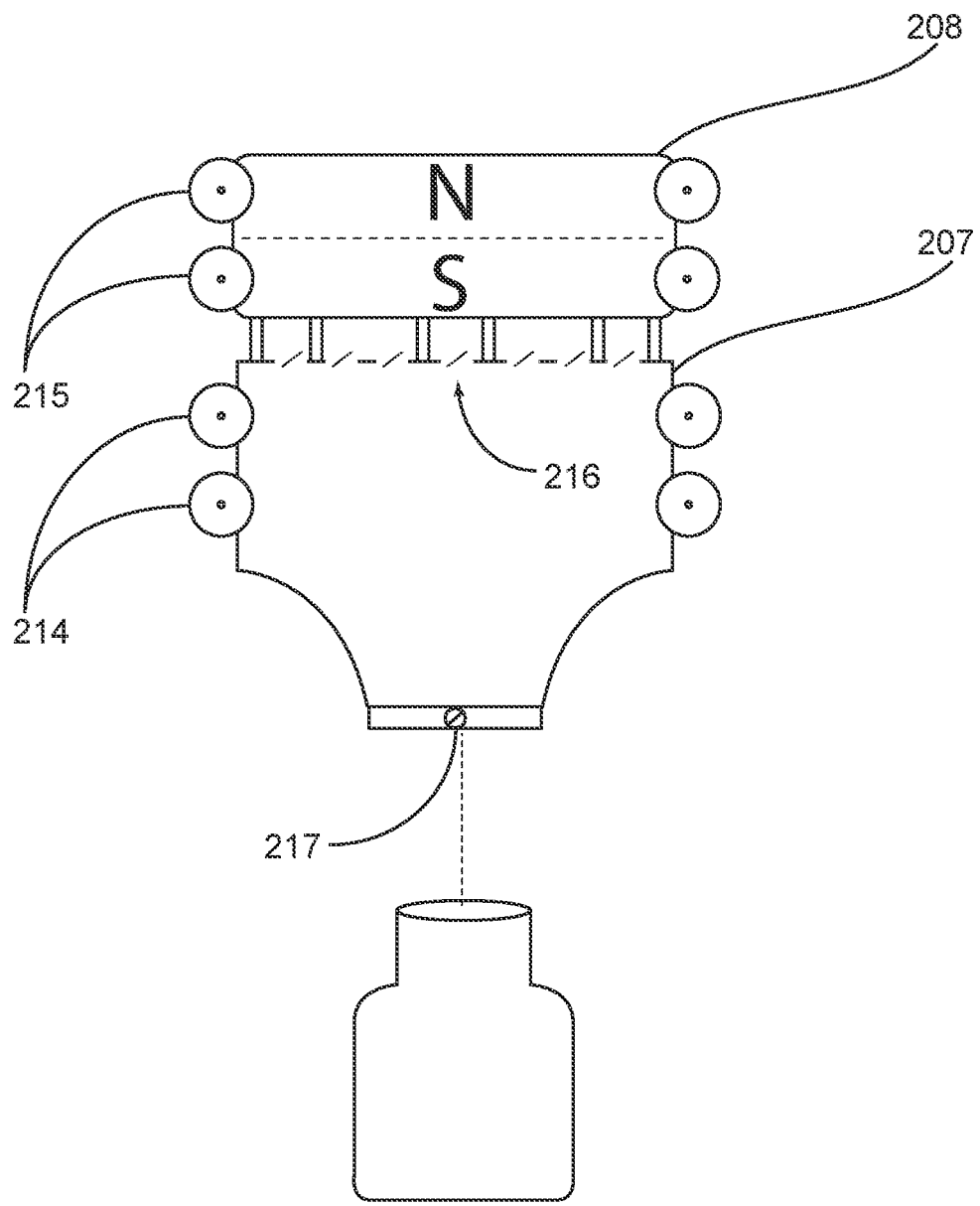
FIG. 9 exemplarily illustrates a cross-sectional view of components of a power generator in accordance with the present invention.

Turning now to FIG. 9, a view of a ballast tank and magnet assembly are shown in accordance with exemplary embodiments of the present invention. More specifically, FIG. 9 depicts ballast tank 207 coupled to magnet 208 via a support structure 220 (see also FIG. 11 and discussion below). In exemplary embodiments, ballast tank 207 may include a plurality of rollers, wheels, or simply ball bearings 214, or any other suitable structure that facilitates a movement along a length of the tubular structure of power generation module 204 with the least amount of resistance or friction. Similarly, magnet 208 may separately include a plurality of rollers, wheels, or simply ball bearings 215, or any other suitable structure that facilitates a movement along a length of the tubular structure of power generation module 204 with the least amount of resistance or friction. As will be discussed in more detail below, magnet 208 is configured to separate from ballast tank 207, and as such, it includes a separate ball bearings 215, or other suitable structure, to allow for movement independent from the ballast tank 207.

In facilitating a separation, and also so that ballast tank is able to fall independently from magnet 208 during operation of system 200, a plurality of valves my be disposed along a surface of the ballast tank 207 such as valves 216. These valves 216 enable any gas held inside ballast tank 207 to be quickly released, allowing the ballast tank to fall back toward the bottom of the tubular hollow housing in which it moves. So that a gas can be injected into the ballast tank 207, valves 217 may be employed, for example and without limiting the scope of the present invention, at a terminal end of the ballast tank such that the tank engages with a gas intake when positioned at the bottom of the tubular housing of the power generation module 204. Without limiting the scope of the present invention, valves may be positioned top side walls, bottom portions of the ballast tank.

Figure 10:
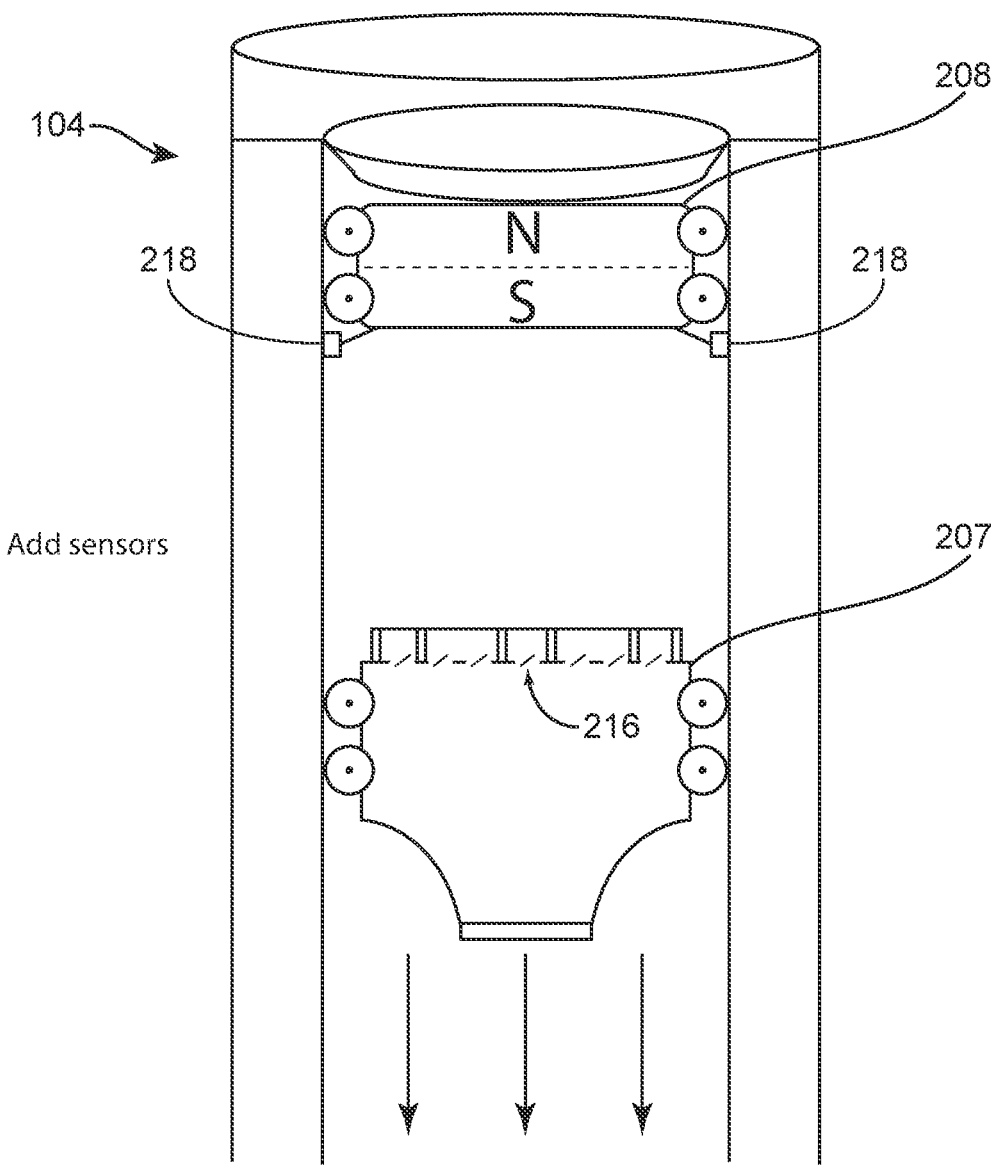
FIG. 10 exemplarily illustrates a cross-sectional view of components of a power generator in accordance with the present invention.

One aspect of the operational process of system 200 may be appreciated from FIG. 10. More specifically, FIG. 10 depicts ballast tank 207 being separated from magnet 208 during operation of system 200. This stage is achieved when air or any other suitable gas has been injected into ballast tank 207 causing ballast tank 207 to move or carry magnet 208 all the way to the top of power generation module 204. Once magnet 208 has reached the top, one or more locking devices 218 may be deployed such that the magnet 208 is not allowed to fall back down the tube (as it normally would be due to gravity, for example). In the interim, valves 216—having been opened upon reaching the top of the tubular structure, release any gas within ballast tank 207. Since ballast tank 207 is not supported by devices 218, and is not secured to the magnet 208, ballast tank 207 falls through the tubular structure while magnet 208 stays at the top. The purpose of this step is to allow time for the ballast tank to reach the bottom, be filled up with gas again, and in the interim, allow the magnet 218 to fall back down at a maximum speed (i.e., not detained by a ballast tank that may move slower due to any gas that may be delayed in leaving the tank). In this way, the magnet may fall and thus move faster through the coil system, thereby generating power more efficiently. Once at the top, the ballast tank 207 can be filled with water so that it falls back to the bottom, as shown in the next view.

Figure 11:
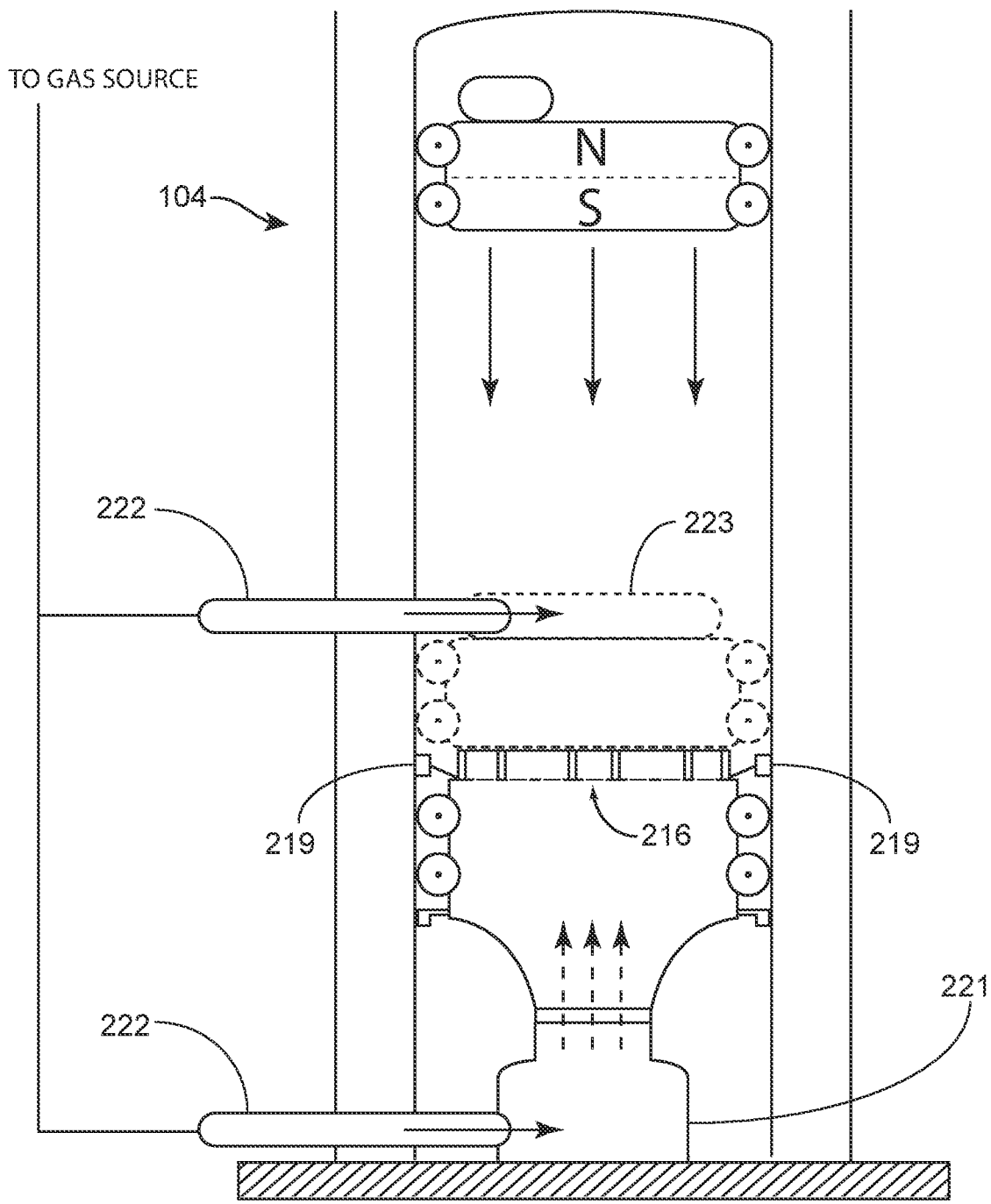
FIG. 11 exemplarily illustrates a cross-sectional view of components of a power generator in accordance with the present invention.

Turning now to FIG. 11, another aspect of the operational process of system 200 is illustrated. In this stage of the process, ballast tank 207 has fallen all the way to the bottom terminal end of the tubular structure of power generation module 204. To lock it in place and avoid the ballast tank moving, locking devices 219 may be deployed here as well. Moreover, valve 217 may be disengaged when the ballast tank 207 engages with a gas injection mechanism 221, and thus allow gas to fill the tank. The one-way valves 216 may be configured to allow any water in the tank to be expelled, while retaining the air or gas being injected into the tank. As the tank buoyancy increases due to its gas-filled cavity, it will have a tendency to be propelled upwards upon release of the locking devices 219. Support structure 220 is configured to releasably engage with at least a portion of the magnet 208, so that when the magnet 208 falls (as shown in this view) it will fall and be supported by ballast tank 207. Upon release of the locking devices 219, the ballast tank will rise up along the tubular structure of structure of power generation module 204, moving the magnet with it across the length of the tube that is encircled with the coil. This cycle repeats to continue producing energy, which may be used for a particular purpose, or stored for later use or distribution.

Additionally, in some exemplary embodiments, a magnet propelling system may be employed in addition to drive assembly 221. For example, during the filling up of the ballast tank 221, a tube 222 in fluid communication with the gas utilized to fill the ballast tank may be used to fill a chamber coupled to or situated on top of magnet 208 when the magnet 208 falls back down (this position shown by dotted lines) and connects with ballast tank 207. Upon reaching the top, for example as shown in FIG. 10, the gas in this chamber may be released to propel or further push the magnet downward through the tube.

Figures 12A, 12B:
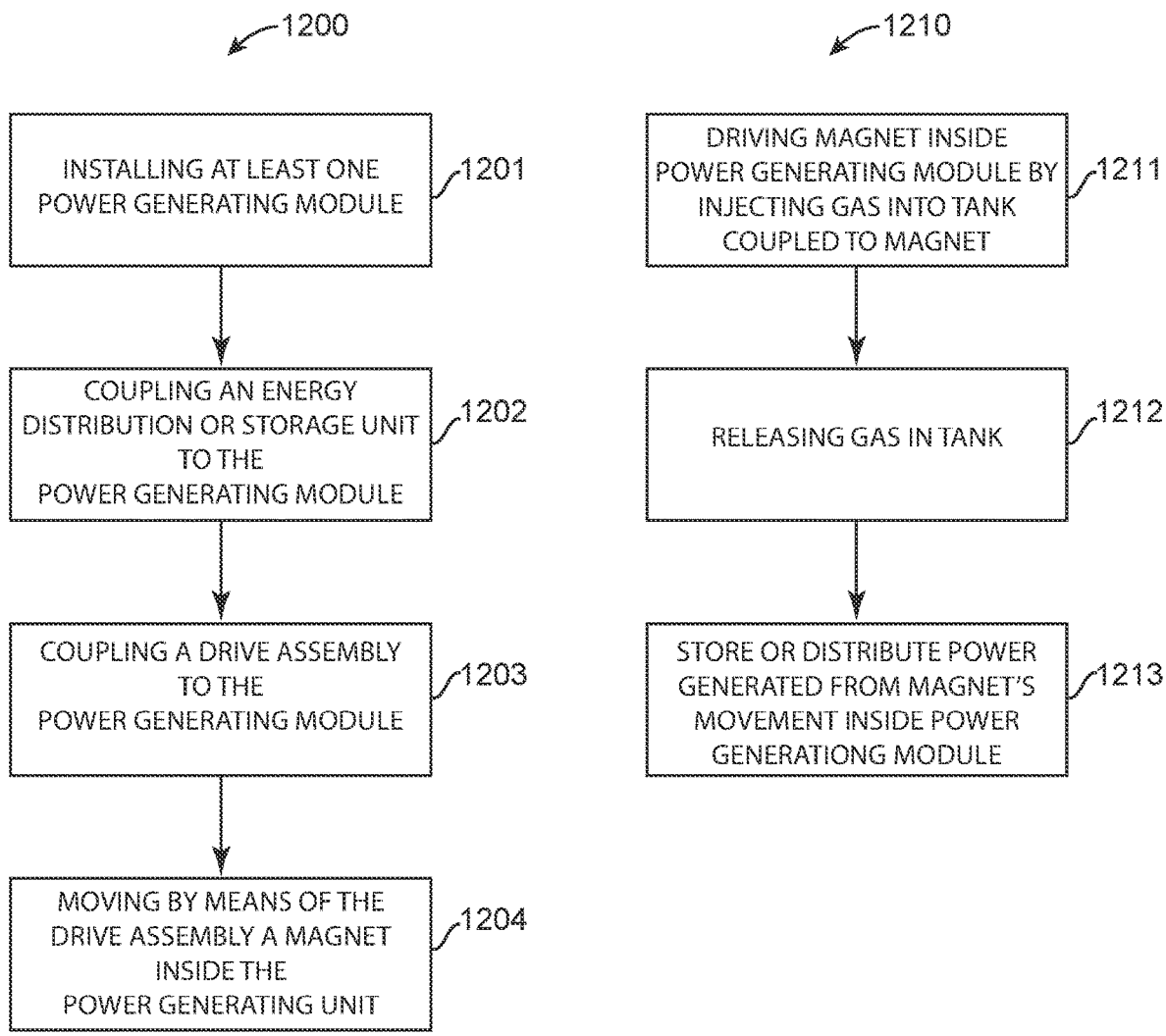
FIG. 12A-FIG. 12B illustrate flowcharts of exemplary methods in accordance with some aspects of the present invention.

FIG. 12A exemplarily illustrates a flowchart of a power generation method according to an embodiment of the present invention. More specifically, FIG. 12 depicts a power generation method 1200 including installing a system in accordance with the present invention.

At step 1201, at least one power producing module is installed in any of the land environment 124 or the water environment 102. The power producing module 204 comprising at least one first hollow member 106 and at least one second hollow member 108 disposed within the first hollow member 106.

In this step, installing at least one power producing module may include providing at least a first hollow tube and a second hollow tube disposed within the first hollow tube; providing at least one conductive coil wound over the second hollow tube; providing at least one magnet configured to move inside of the second hollow tube along a length of the conductive coil; and filling the second hollow tube with a fluid.

At step 1202, an energy distribution or storage unit may be coupled to the conductive coil of the power producing module.

At step 1203, a drive assembly configured to apply a gas into at least a portion of the second hollow tub of the power producing module.

At step 1204, the magnet may be moved, by means of the drive assembly, inside of the second hollow tube along the length of the conductive coil to generate power.

Accordingly, in one aspect of the invention, a method 1200 may be employed to install and run the system, including the steps of: installing at least one power producing module including: providing at least a first hollow tube and a second hollow tube disposed within the first hollow tube; providing at least one conductive coil wound over the second hollow tube; providing at least one magnet configured to move inside of the second hollow tube along a length of the conductive coil; and filling the second hollow tube with a fluid; coupling an energy distribution or storage unit to the conductive coil of the power producing module; coupling a drive assembly configured to apply a gas into at least a portion of the second hollow tub of the power producing module; and moving, by means of the drive assembly, the at least one magnet inside of the second hollow tube along the length of the conductive coil to generate power.

In some exemplary embodiments, installing the at least one power producing module further includes providing a ballast tank inside the second hollow tube, the ballast tank configured to move the magnet inside of the second hollow tube along a length of the conductive coil. In some exemplary embodiments, coupling the drive assembly comprises removably connecting the drive assembly to the ballast tank inside the second hollow. In some exemplary embodiments, moving the at least one magnet by means of the drive assembly comprises filling the ballast tank with gas.

In some exemplary embodiments, the method may further include restraining the ballast tank while filling the ballast tank with the gas; and releasing the ballast tank once the ballast tank is filled with gas so that the ballast tank is driven upwards along the length of the conductive coil wound around the second hollow tube.

In some exemplary embodiments, the method may further include upon the ballast tank moving the magnet to a top terminal end of the second hollow tube, restraining the magnet at the top terminal; releasing gas from the ballast tank to allow the ballast tank to fall downwards to a bottom terminal end of the second hollow tube; and releasing the magnet at the top terminal so that the magnet falls downward along the length of the conductive coil wound around the second hollow tube. In exemplary embodiments, moving by means of the drive assembly the at least one magnet inside of the second hollow tube comprises generating gas bubbles that cause the magnet to flow upwards along the length of the conductive coil wound around the second hollow tube.

In exemplary embodiments, installing the at least one power producing module further includes fluidly connecting the second hollow tube disposed within the first hollow tube of the at least one power producing module to an exterior fluid tank.

In exemplary embodiments, installing the at least one power producing module further includes coupling a gas storage unit to the drive assembly. In some aspects of the invention, a method may be performed by a system. Such method may include, driving at least one magnet upwards along a length of a hollow tube filled with a fluid by filling, with a gas, a ballast tank removably coupled to the at least one magnet, wherein at least one conductive coil is wound over and along the length of the hollow tube; releasing the gas from the ballast tank to allow the magnet to fall downwards along a length of the hollow tube; and distributing or storing power generated by the movement of the magnet upwards and downwards along a length of the at least one conductive coil wound over and along the length of the hollow tube.

In exemplary embodiments, the method may further comprise of restraining the ballast tank at a bottom of the hollow tube while filling the ballast tank with the gas, and further releasing the ballast tank once the ballast tank is filled with the gas so that the ballast tank is driven upwards to a top terminal end of the hollow tube along the length of the conductive coil.

In exemplary embodiments, upon the ballast tank moving the magnet to a top terminal end of the hollow tube, the magnet at the top terminal end of the hollow tube may be restrained. Furthermore, the gas may be released from the ballast tank to allow the ballast tank to fall downwards to a bottom terminal end of the second hollow tube.

In exemplary embodiments, the magnet may be released at the top terminal so that the magnet falls downward along the length of the conductive coil wound around the hollow tube.

In exemplary embodiments, the method may further include restraining the ballast tank at a bottom of the hollow tube or restraining the magnet at the top terminal end of the hollow tube comprises activating a locking mechanism. In some embodiments, activating the locking mechanism comprises activating a programmable time release. In some embodiments, activating the locking mechanism comprises activating a sensor to detect a position of the ballast tank or a position of the magnet. In some embodiments, while filling the ballast tank with the gas, water from the ballast tank may be expelled by way of valves disposed on the ballast tank. Moreover, in some embodiments, a gas or other propellant may be used to propel or speed up the movement of the magnet through the hollow tube and along the length of the conductive coil.

FIG. 12B exemplarily illustrates a flowchart of a power generation method according to an embodiment of the present invention. More specifically, FIG. 12B depicts a power generation method 1210 performed by a system in accordance with the present invention.

At step 1211, at least one magnet may be driven upwards along a length of a hollow tube filled with a fluid by filling, with a gas, a ballast tank removably coupled to the at least one magnet, wherein at least one conductive coil is wound over and along the length of the hollow tube.

At step 1212, the gas may be released from the ballast tank to allow the magnet to fall downwards along a length of the hollow tube.

At step 1213, power generated by the movement of the magnet upwards and downwards along a length of the at least one conductive coil wound over and along the length of the hollow tube may be stored or distributed.

Accordingly, in this aspect of the invention, a method 1210 performed by a power generation system may include the steps of: driving at least one magnet upwards along a length of a hollow tube filled with a fluid by filling, with a gas, a ballast tank removably coupled to the at least one magnet, wherein at least one conductive coil is wound over and along the length of the hollow tube; releasing the gas from the ballast tank to allow the magnet to fall downwards along a length of the hollow tube; and distributing or storing power generated by the movement of the magnet upwards and downwards along a length of the at least one conductive coil wound over and along the length of the hollow tube.

In some exemplary embodiments, the method further includes restraining the ballast tank at a bottom of the hollow tube while filling the ballast tank with the gas.

In some exemplary embodiments, the method further includes releasing the ballast tank once the ballast tank is filled with the gas so that the ballast tank is driven upwards to a top terminal end of the hollow tube along the length of the conductive coil.

In some exemplary embodiments, the method further includes upon the ballast tank moving the magnet to a top terminal end of the hollow tube, restraining the magnet at the top terminal end of the hollow tube.

In some exemplary embodiments, the method further includes releasing the gas from the ballast tank to allow the ballast tank to fall downwards to a bottom terminal end of the second hollow tube.

In some exemplary embodiments, the method further includes releasing the magnet at the top terminal so that the magnet falls downward along the length of the conductive coil wound around the hollow tube.

In some exemplary embodiments, restraining the ballast tank at a bottom of the hollow tube or restraining the magnet at the top terminal end of the hollow tube comprises activating a locking mechanism. In some exemplary embodiments, activating the locking mechanism comprises activating a programmable time release. In some exemplary embodiments, activating the locking mechanism comprises activating a sensor to detect a position of the ballast tank or a position of the magnet.

In some exemplary embodiments, the method further includes, while filling the ballast tank with the gas, expelling water from the ballast tank by way of valves disposed on the ballast tank.

Advantageously, a system in accordance with the present invention could be easily installed in water environment and land environments. The system is a cost-effective and easy-to-operate system that continuously generates electric power. Mainly, the system and its method of operation helps to power a cryptocurrency mining operation, but also any other suitable purpose requiring electricity.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method of generating power, comprising:
    installing at least one power producing module including:
        providing at least a first hollow tube and a second hollow tube disposed within the first hollow tube;
        providing at least one conductive coil wound over the second hollow tube;
        providing at least one magnet configured to move inside of the second hollow tube along a length of the conductive coil; and
        filling the second hollow tube with a fluid;
    coupling an energy distribution or storage unit to the conductive coil of the power producing module;
    coupling a drive assembly configured to apply a gas into at least a portion of the second hollow tub of the power producing module; and
    moving, by means of the drive assembly, the at least one magnet inside of the second hollow tube along the length of the conductive coil to generate power.

2. The method of claim 1, wherein installing the at least one power producing module further includes providing a ballast tank inside the second hollow tube, the ballast tank configured to move the magnet inside of the second hollow tube along a length of the conductive coil.

3. The method of claim 2, wherein coupling the drive assembly comprises removably connecting the drive assembly to the ballast tank inside the second hollow tube.

4. The method of claim 3, wherein moving the at least one magnet by means of the drive assembly comprises filling the ballast tank with gas.

5. The method of claim 4, further comprising:
restraining the ballast tank while filling the ballast tank with the gas; and
releasing the ballast tank once the ballast tank is filled with gas so that the ballast tank is driven upwards along the length of the conductive coil wound around the second hollow tube.

6. The method of claim 5, further comprising:
upon the ballast tank moving the magnet to a top terminal end of the second hollow tube, restraining the magnet at the top terminal;
releasing gas from the ballast tank to allow the ballast tank to fall downwards to a bottom terminal end of the second hollow tube; and
releasing the magnet at the top terminal so that the magnet falls downward along the length of the conductive coil wound around the second hollow tube.

7. The method of claim 1, wherein moving by means of the drive assembly the at least one magnet inside of the second hollow tube comprises generating gas bubbles that cause the magnet to flow upwards along the length of the conductive coil wound around the second hollow tube.

8. The method of claim 1, wherein installing the at least one power producing module further includes submerging the power producing module underwater.

9. The method of claim 1, wherein installing the at least one power producing module further includes:
fluidly connecting the second hollow tube disposed within the first hollow tube of the at least one power producing module to an exterior fluid tank.

10. The method of claim 1, wherein installing the at least one power producing module further includes coupling a gas storage unit to the drive assembly.

11. A method performed by a power generation system, comprising:
driving at least one magnet upwards along a length of a hollow tube filled with a fluid by filling, with a gas, a ballast tank removably coupled to the at least one magnet, wherein at least one conductive coil is wound over and along the length of the hollow tube;
releasing the gas from the ballast tank to allow the magnet to fall downwards along a length of the hollow tube; and
distributing or storing power generated by the movement of the magnet upwards and downwards along a length of the at least one conductive coil wound over and along the length of the hollow tube.

12. The method of claim 11, further comprising restraining the ballast tank at a bottom of the hollow tube while filling the ballast tank with the gas.

13. The method of claim 12, further comprising releasing the ballast tank once the ballast tank is filled with the gas so that the ballast tank is driven upwards to a top terminal end of the hollow tube along the length of the conductive coil.

14. The method of claim 13, further comprising:
upon the ballast tank moving the magnet to a top terminal end of the hollow tube, restraining the magnet at the top terminal end of the hollow tube.

15. The method of claim 14, further comprising releasing the gas from the ballast tank to allow the ballast tank to fall downwards to a bottom terminal end of the second hollow tube.

16. The method of claim 15, further comprising releasing the magnet at the top terminal so that the magnet falls downward along the length of the conductive coil wound around the hollow tube.

17. The method of claim 13, wherein restraining the ballast tank at a bottom of the hollow tube or restraining the magnet at the top terminal end of the hollow tube comprises activating a locking mechanism.

18. The method of claim 17, wherein activating the locking mechanism comprises activating a programmable time release.

19. The method of claim 17, wherein activating the locking mechanism comprises activating a sensor to detect a position of the ballast tank or a position of the magnet.

20. The method of claim 11, further comprising, while filling the ballast tank with the gas, expelling water from the ballast tank by way of valves disposed on the ballast tank.

* * * * *